United States Patent [19]
Wang

[11] 4,300,046
[45] Nov. 10, 1981

[54] PANEL TYPE X-RAY IMAGE INTENSIFIER TUBE AND RADIOGRAPHIC CAMERA SYSTEM

[75] Inventor: Shih-Ping Wang, Los Altos, Calif.

[73] Assignee: Diagnostic Information, Inc., Sunnyvale, Calif.

[21] Appl. No.: 71,701

[22] Filed: Aug. 31, 1979

Related U.S. Application Data

[60] Division of Ser. No. 923,719, Jul. 12, 1978, Pat. No. 4,186,302, and Ser. No. 853,440, Nov. 21, 1977, Pat. No. 4,140,900, and a continuation-in-part of Ser. No. 741,430, Nov. 12, 1976, abandoned, and Ser. No. 763,637, Jan. 28, 1977, abandoned.

[51] Int. Cl.³ .............................................. G03B 41/16
[52] U.S. Cl. ..................................................... 250/323
[58] Field of Search ............ 250/213 R, 213 VT, 207, 250/320, 323, 460, 483; 313/94, 95

[56] References Cited

U.S. PATENT DOCUMENTS 2,158,853 5/1939 Coolidge ............................ 250/320
2,198,479 4/1940 Langmuir .................... 250/213 VT
2,510,965 6/1950 Draeger et al. ...................... 250/320
2,586,392 2/1952 Sheldon .............................. 313/380
3,394,261 7/1968 Manley et al. ............... 250/213 VT
4,204,118 5/1980 Sheldon ....................... 250/213 VT

*Primary Examiner*—Bruce C. Anderson
*Attorney, Agent, or Firm*—Limbach, Limbach & Sutton

[57] ABSTRACT

A panel shaped, proximity type, x-ray image intensifier tube for medical x-ray diagnostic use having all linear components and yet a high brightness gain, in the range of 500 to 20,000 cd-sec/$m^2$-R, the tube being comprised of a rugged metallic tube envelope, an inwardly concave, iron, nickel, chromium alloy input window, a full size output display screen, a halide activated alkaline-halide scintillator photocathode screen suspended on insulators within the envelope and in between the input window and the output screen, and a high Z glass output window to reduce x-ray backscatter inside and outside of the tube. The tube can be used in a direct view, photofluorographic mode, in a radiographic camera system and with a remote view T.V. system.

1 Claim, 7 Drawing Figures

PANEL TYPE X-RAY IMAGE INTENSIFIER TUBE AND RADIOGRAPHIC CAMERA SYSTEM

CROSS REFERENCE TO RELATED APPLICATION

This is a division of applications Ser. Nos. 853,440, filed Nov. 21, 1977, now U.S. Pat. No. 4,140,900, and 923,719, filed July 12, 1978, now U.S. Pat. No. 4,186,302.

This application is a continuation-in-part of my co-pending application, Ser. No. 741,430, entitled X-RAY RADIOGRAPHIC CAMERA, and filed on Nov. 12, 1976, now abandoned and of Ser. No. 763,637, entitled PANEL TYPE X-RAY IMAGE INTENSIFIER TUBE and filed Jan. 28, 1977, now abandoned. This application is also related to the copending application Ser. No. 763,638, filed Jan. 28, 1977 and entitled DIRECT VIEW, PANEL TYPE X-RAY IMAGE INTENSIFIER TUBE.

BACKGROUND OF THE INVENTION

The invention pertains to medical x-ray apparatus, and more particularly to an x-ray image intensifier tube of the proximity type for medical x-ray diagnostic use.

The common present day x-ray image intensifier tube is of the electrostatically focused inverter type with a 100 fold area minified output image size. This conventional inverter type x-ray image intensifier tube typically has a convexly curved, six to nine inch diameter input x-ray sensitive screen which converts the x-ray image into a light image which, in turn, is converted into electrons which are then accelerated and electrostatically focused onto an output image screen which is 100 times smaller in area than the input screen, being typically 0.6 inches to 1.0 inches in diameter. The displayed image on the output screen can be optically magnified and coupled to othe systems for radiographic or fluoroscopic purposes. Radiographic film is defined here as film which can be viewed directly without optical or electronic aids. We have found that the anatomical scale should not be minified more than 4.0 times. We found that 1.5 to 4.0 minification is acceptable. For example, for radiographic purposes, the image is optically coupled to a film camera or a photographic film. For fluoroscopic puposes, the image can be displayed either by using a system of mirrors and lenses for direct viewing or by using a closed circuit television camera and monitor for remote viewing.

The conversion efficiency of such a conventional image intensifier system is usually around 350,000 to 700,000 erg/cm$^2$-R or about 50,000 to 100,000 cd-sec/m$^2$-R, which is about 5,000 to 10,000 times the conversion efficiency of the old-time fluoroscopic screen. Part of this intensification is obtained as true electronic gain, which is about 50 to 100 times over the old-time fluoroscopic screen. Another factor of 100 gain is obtained through the 100 fold area minification of the image of the output screen.

The image quality of the conventional inverter type image intensifier tube is reasonably adequate for fluoroscopic use, but is far short of the requirement for radiographic use. The requirements for radiographic use are established by the conventional film-screen system, which demands a 20% modulation transfer function response at between 2 to 3 line pairs per millimeter.

Such conventional film-screen systems are commercially available in speeds ranging from 250 R$^{-1}$ to 8000 R$^{-1}$. The speed is defined as the reciprocal of the x-ray exposure in terms of roentgens, R, to the film-screen system to result in a net optical density of 1.0 on the processed film. The spatial resolving ability of the film-screen system is generally inversely proportional to the speed of the system. That is, the higher the spatial resolving ability the lower the speed of the system.

While film-screen systems have desirable system speed qualities, they have the drawback that they require taking full size photos which are difficult to store and which are becoming increasingly more expensive due to the rising cost of the silver halide x-ray film. Also, the film cannot be monitored during exposure to control the dosage or timing.

A recent article published by C. B. Johnson in the *Proceedings of the Society of Photo Optical Instrumentation Engineers,* Volume 35, pages 3-8 (1973), hypothetically suggests that an x-ray sensitive proximity type image intensifier may be designed with an x-ray sensitive conversion screen on one side of a glass support and a photocathode on the other side of the glass support. However, the article gives no specifics concerning the critical parameters or what might be used as the x-ray sensitive conversion screen. How this image intensifier can be designed to result in high conversion efficiency or high resolution was also not discussed.

A proximity device using a michrochannel plate (MCP) both as the primary x-ray sensitive conversion screen and as an electron multiplication device was described by S. Balter and his associates in *Radiology,* Volume 110, pages 673-676 (1974), and by Manley et al. in U.S. Pat. No. 3,394,261. According to an article published by J. Adams in *Advances in Electronics and Electron Physics,* Volume 22A (Academic Press, 1966), pages 139-153, this type of device has a very low quantum detection efficiency in the practical medical diagnostic x-ray energy range of 30-100 Kev. The device gain of the Balter article was first reported to be 20-30 cd-sec/m$^2$-R which is too low to be useful as a radiographic or fluoroscopic device. A higher gain device described in the same Balter article exhibited excessive noise. There is a real question whether a practical self-supporting MCP plate with uniform gain can be constructed with current technology to sizes beyond five to six inches in diameter which is not of sufficient size to produce an output useful for radiographic purposes.

Another approach involving proximity design was taken by I. C. P. Millar and his associates and their results were published in (1) *IEEE Transactions on Electron Devices,* Volume ED-18, pages 1101-1108 (1971), and (2) *Advances in Electronics and Electron Physics,* Volume 33A, pages 153-165 (1972).

Millar's approach again involves the use of a microchannel plate (MCP). In this device, however, the MCP is used purely as an electron multiplication device and not as an x-ray conversion screen. The conversion factor for Millar's tube is reported to be around 200,000 cd-sec/m$^2$-R, which is above or higher than needed for fluoroscopic purposes, but is far too high for radiographic purposes. However, the output brightness of Millar's tube also exhibits strong dependence on the photocathode current density. At around a photocathode current density of $5\times10^{-11}$ amperes/cm$^2$ or at the equivalent x-ray input dose rate of around $0.6\times10^{-3}$ R/sec, the output brightness of the tube starts to become sublinear in response with respect to the input x-ray dose rate. The sublinear response becomes worse at higher x-ray dose rate. This undesirable feature reduces contrast discrimination during fluoroscopy and is virtually useless for radiography. Again, it is unknown whether a large format beyond six inches in diameter, self-supporting and with uniform gain, MCP can be fabricated.

The Millar proximity type image intensifier tube has a glass envelope and an inwardly concave, titanium input window. The window is described as being 0.3 mm thick. Materials such as titanium, aluminum and beryllium cause undesirable scattering of the x-rays which reduces the image quality. Furthermore, because of the relatively high porosity and low tensile strength properties of such materials, they cannot be made as thick as desirable to maximize their x-ray transmissive properties. Still another problem with tubes constructed with such materials for the input window and glass for the tube envelope is in joining the window to the tube envelope. The materials have such dissimilar thermal expansion properties, among other differences, as to preclude their practical commercial use in a large format device.

In all such prior art x-ray image intensification devices there is the further problem of x-ray back scatter at the output display screen due to x-rays passing both out of the tube output window and coming into the tube through the output window. This can distort the displayed image and pose a danger to the user of the device.

SUMMARY OF THE INVENTION

The above and other disadvantages of prior art x-ray image intensifier tubes are overcome by the present invention of an x-ray sensitive image intensifier tube characterized by an essentially metallic tube envelope, an inwardly concave, metallic input window in the tube envelope, the input window being made in the preferred embodiment of an alloy of iron, chromium and nickel, a flat, directly viewable output phosphor display screen, a flat scintillator-photocathode screen which is operated at a negative high potential with respect to the remining tube components including the tube envelope and the output display screen. The scintillator-photocathode screen is suspended parallel to the output screen with insulating posts in between the input window and the output screen. The image intensifier tube of the invention has a linear response with respect to input x-ray dose rates in excess of 0.06 R/sec.

In the preferred embodiments, the brightness gain (conversion efficiency) is in the range of 500 to 20,000 cd-sec/m-R, the gap spacing between the scintillator-photocathode screen and the output screen is in the range of 6 to 25 mm, and the thickness of the scintillator is in the range of 50 to 600 microns, whereby high x-ray utilization, high gain, high image quality and low field emission are simultaneously obtained.

A high Z glass output window reduces x-ray back scatter and further protects the operator of the tube from the x-rays. A collar of iron-nickel alloy is fritted to the output window and welded to the tube envelope for mounting the output window in the tube envelope.

Although the image intensifier tube used in the preferred embodiment of the invention has an essentially flat or planar input x-ray sensitive screen, it may be slightly curved for the purpose of increasing the mechanical strength of the screen, in other embodiments. The tube is quite thin and compact in size compared to a conventional image intensifier system. The input area can be square, rectangular or circular in shape in the various embodiments. As discussed above, in a conventional inverter type image intensifier tube the input screen is limited to a circular disc shape and is commonly outwardly curved.

The main advantage of this invention is the absence of three sources of "unsharpness": the electron optics, the output phosphor screen, and the external optics. All this is due to the large full-size output image. Also absent are the shallowness of the depth of field of the electron optics and the external optics. Again, this is due to the large full-size output image. The electrical field in the space between the input and output screens of the image intensifier tube of the present invention is quite high compared to a conventional tube and the cathode region field strength is about 100 times higher than that of a conventional tube, thus it is not sensitive to external magnetic fields and defocusing problems encountered when subjected to bursts of high intensity, short millisecond duration pulses.

Furthermore, since the metallic tube envelope and all of the basic tube components except the scintillator-photocathode screen are at a neutral potential with respect to the output display screen, spurious electron emission is avoided, resulting in a clearer display.

The absence of some of the sources of "unsharpness" allows this invention to improve the performance of an image intensifier tube in several different ways. For example, much higher gain and patient dose reduction can be achieved by using a thicker (200 to 600 micron) input x-ray to light conversion screen and still having acceptable image resolution for fluoroscopic applications. Another example is to provide a radiographic camera by obtaining a very high image resolution at the output screen through the use of a 50 to 100 microns thick scintillator screen and a narrower (6 to 10 mm) photocathode to display screen gap spacing. This output display can then be photographed.

In the preferred embodiment of such a radiographic camera according to the invention, reduction type optics focus the full size output display onto photographic film which is smaller in diagonal dimension than the output display screen. The film sensitiviy (G) is defined as the reciprocal of incident light energy in ergs per square centimeter ($erg/cm^2$) which is required to produce a net density of 1.0. More specifically the film sensitivity is chosen to be in the range of 5 to 100 $cm^2/erg$. The image intensifier tube is chosen to have a conversion efficiency (C) in the range of 1,000 to 30,000 $erg/cm^2$-R, or, if the output phosphor is green emitting, in the range of 140 to 4,300 cd-sec/$m^2$-R. The fractional light energy (T) emitted by the output screen which is collected by the optics and which is transferred to the photographic film can be approximated by the relationship:

$$T = \frac{t}{4f^2(1+m)^2}$$

where, t=transmission of the optical system f=the f number of the optical system, and m=magnification of the image, or ratio of image to object size, and is approximately in the range of $1\times10^{-1}$ to $1\times10^{-3}$. In this embodiment, the total speed of the camera (S=CTG) in the medical diagnostic region of the x-ray spectrum, i.e., 30-100 Kev, is in the range of 100 to 10,000 $R^{-1}$. In a preferred embodiment, where the conversion efficiency (C) is in the range of 3,000 to 14,000 erg/cm$^2$-R, the system speed (S) is in the range of 500 to 5,000 $R^{-1}$.

The x-ray sensitive photographic camera according to one embodiment of the invention is thus designed to have a system speed which is optimal to take maximum advantage of the amount of information provided by the incident x-ray quanta such that the recorded image will have a balanced image quality for the x-ray information. The image quality of the photographs produced by the system of the invention is as good as that of conventional cassette film-screen systems, which is not achievable with conventional inverter type image intensifier systems. However, with the camera of the invention, smaller than full size films can be used with no loss of x-ray information. This allows for a significant reduction in required storage space for the developed films. Also, the camera can be modified by a beam splitting mirror to simultaneously generate a second photograph of the x-ray information. A second optical system, placed off axis, may also be used to generate the second photograph.

One of the most important features of the camera system is that the long focal length, in excess of 100 mm optics in the preferred embodiment, the non-minified output image size, and small aperture optical system give the system greater tolerance for thermal expansions, dimensional changes, etc. than a convention image intensifier x-ray camera system which is extremely sensitive to such changes. Also, the optical system can be folded so that the camera system can be made more compact, which is an important feature in a cramped radiological examination room, than can a conventional system of comparable input format size.

Moreover, the image intensifier of the present system allows stereo x-ray photographs to be produced with no image distortion. This is primarily due to the fact that the input x-ray conversion screen is flat (planar) as opposed to the conventional curved input screen of the other prior art image intensifier tubes.

Still another advantage is that the x-ray sensitive area input format size of the camera system can be expanded without sacrificing image quality as would happen with conventional inverter type image intensifier systems. A still further advantage of the present system is that it can be easily photo-timed with a sensing device directly monitoring the output image to obtain consistent exposure on each film.

Unlike the proximity x-ray image intensifiers heretofore discussed, the x-ray image intensifier tube of the present invention achieves high conversion efficiency without requiring the use of additional multiplication means or non-linear responding components, i.e., a micro-channel plate between the output phosphor screen and the photocathode. As a result, the x-ray image intensifier tube of the present invention is mechanically simpler, more reliable and exhibits a linear response with respect to input x-ray dosages in excess of 0.06 R/sec, the dosage used for medical diagnostic purposes.

Among the many advantages of the invention are the light weight, the simplicity of the tube and its compact size. For example, when the tube is used in a direct view, fluoroscopic mode, the physician can have easy access to the patient for palpation and can observe the effects of palpation without having to turn away from the patient, as is necessary in the present day systems having an inverter type image intensifier coupled to a television display.

In other embodiments of the invention, such as for use in teaching institutions, for example, it may be desirable to provide remote displays of the output of the x-ray image intensifier tube's large output display screen which is quite easily coupled to a silicon intensifier target (SIT) tube type closed circuit television system for remote viewing or for video recording.

Still another advantage is that the x-ray sensitive area input format size of the system can be expanded without sacrificing image quality as would happen with conventional inverter type image intensifier systems.

It is therefore an object of the present invention to provide a proximity type, x-ray sensitive image intensifier tube having a metal input window which minimizes x-ray self scattering and back scattering effects.

It is another object of the invention to provide an x-ray image intensification tube having a flat x-ray conversion input screen to reduce image distortion.

It is yet another object of the invention to provide a panel type x-ray image intensifier tube of rugged design for medical diagnostic purposes which minimizes the danger of injury to the patient resulting from implosion of the tube.

It is a further object of the invention to provide a panel type x-ray image intensifier tube having a nearly full size output display which is aligned with that portion of the patient which is being irradiated by the x-rays.

It is a still further object of the invention to provide an x-ray image intensifier tube capable of having either a square, rectangular or circular or other freely shaped input format, and that the format size is expandable to 17×17 inches.

It is yet a further object of the invention to provide an x-ray image intensifier tube which is not sensitive to the effects of voltage drifts, external magnetic fields, and field emission.

It is still another object of the present invention to provide an x-ray radiographic camera having a system speed and image quality comparable to conventional film screen systems.

It is also an object of the invention to provide an x-ray radiographic camera utilizing a directly viewable reduced size film, with a film size smaller than the input x-ray image size; and It is yet a further object of the invention to provide an x-ray radiographic camera having long focal length optics to increase the dimensional stability tolerance of the system.

The foregoing and other objectives, features and advantages of the invention will be more readily understood upon consideration of the following detailed description of certain preferred embodiments of the invention, taken in conjunction with the accompanying drawings.

DETAILED DESCRIPTION OF THE PREFERRED EMBODIMENT

Figure 1:
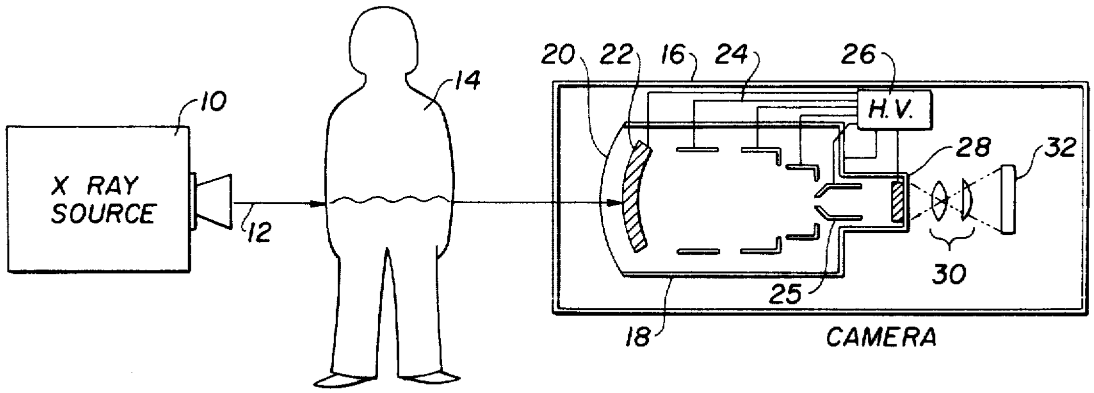
FIG. 1 is a diagrammatic illustration of a conventional inverter type image intensifier x-ray tube.

Referring now more particularly to FIG. 1, a conventional inverter type x-ray image intensifier tube is illustrated. An x-ray source 10 generates a beam of x-rays 12 which pass through the patient's body 14 and casts a shadow image onto the face of a camera system 16. The camera system includes a conventional inverter type image intensifier vacuum tube 18. The tube 18 has an outwardly convex input window 20 and a correspondingly convex scintillator screen and photocathode assembly 22. The purpose of this scintillator screen, as is well known to those skilled in that art, is to convert the x-ray shadow image into a light image, which, in turn, is immediately converted by the photocathode layer into a pattern of electrons. This pattern of electrons is electrostatically accelerated by a set of electrodes 24 and anode 25 near the display screen 28 and is focused by this set of electrodes 24 and anode 25 to form an image on the small output screen 28. The electrodes 24 and anode 25 are connected to a high voltage source 26 whose other lead is connected to the scintillator and photocathode screen assembly 22. The tube body is made of insulating glass. The image at the output display screen 28 is magnified by a short focal length optical system 30 and is projected onto suitable recording media, such as film 32. The image could also be projected onto the sensitive area of the closed-circuit television camera for display on a closed circuit monitor in a fluoroscopic mode.

The brightness gain of the image by the tube 18 is due partly to the electron acceleration and partly to the result of electronic image minification. This is the result of reducing the image generated on the scintillator screen 22 down to a relatively small image at the output display screen 28. The reduced image on the display screen 28 is too small however, to allow direct viewing without optical aids. Moreover, the quality of the image is reduced both by the quality of the electron optics and by the quality of the output phosphor screen in the electronic image minification, and by the subsequent enlarging of the output image onto the film or onto the monitor screen by the closed circuit television system.

Another disadvantage is that because of the curved scintillator screen 22, there is a spatial distortion produced in the image due to x-ray projection on the curved surface and due to the field configuration in the tube. Still another problem is that because of the weak field near the cathode region and the multi-electrode arrangement 24, the tube 18 is extremely sensitive to external magnetic fields and voltage drifts among the electrodes. Both of these factors can cause distortion and unsharpness in the produced image.

Yet another problem is that because of the greatly minified output image and the short focal length optics 30, any change in the positioning of the elements of the optical system with respect to the photosensitive layer of the camera tube or the output screen 28, will render the image out of focus. This can result from vibration or from thermal expansion.

One other major disadvantage of the conventional system is that because of the curved glass window 20 which is necessary to withstand the pressures due to the vacuum inside the tube 18 and the already very weak field strength in the cathode region, the system is limited to approximately nine inches in input format for optimum performance. Any greater diameter input will necessitate a much higher tube voltage and a thicker input window which would cause increased problems due to ion spots inside the tube and x-ray transmission and scattering in the input window. Even in the conventional sized tubes, there is also, of course, the danger to the patient and the radiologist that the tube might fracture causing an implosion and resulting ejection of the glass fragments.

Figure 2:
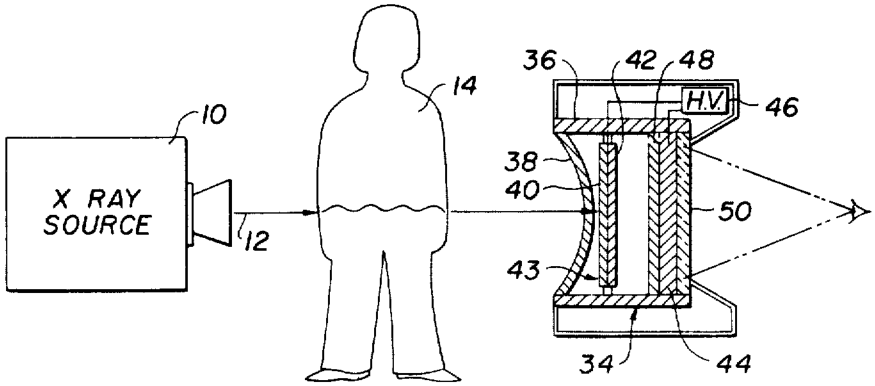
FIG. 2 is a diagrammatic illustration of the x-ray image intensifier tube according to the invention.
Figure 3:
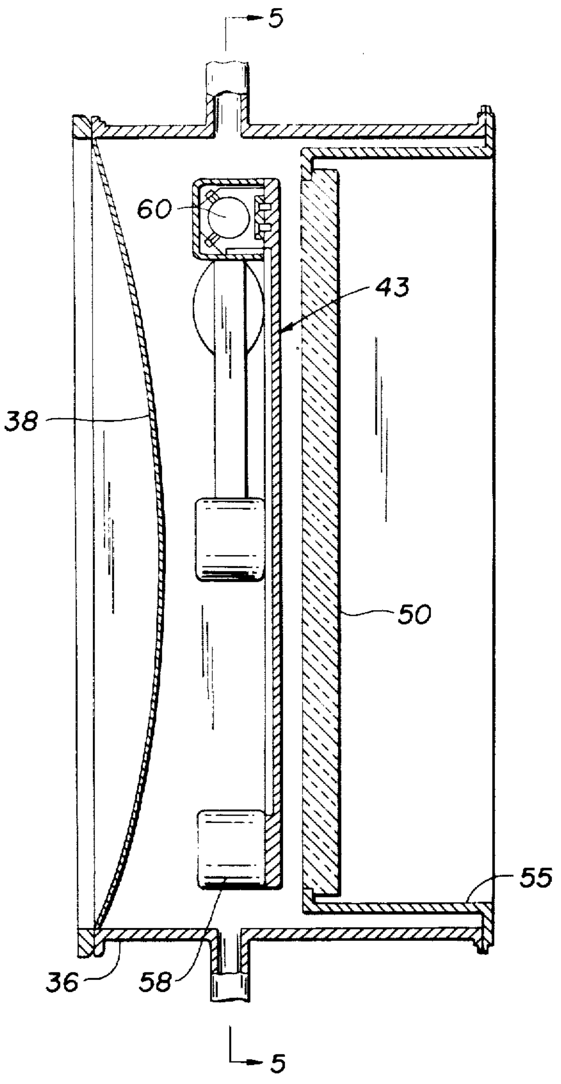
FIG. 3 is a detailed vertical view, in section, of the image intensifier tube of the invention.

Referring now more particularly to FIG. 2, a panel shaped proximity type x-ray image intensifier tube according to the invention is illustrated. The image intensifier tube 34 comprises a metallic, typically type 304 stainless steel, vacuum tube envelope 36 and a metallic, inwardly concave input window 38. The window 38 is made of a specially chosen metal foil or alloy metal foil in the family of iron, chromium, and nickel, and in some embodiments, additionally combinations of iron or nickel together with cobalt or vanadium. It is important to note that these elements are not customarily recognized in the field as a good x-ray window material in the diagnostic region of the x-ray spectrum. By making the window thin, down to 0.1 mm in thickness, the applicant was able to achieve high x-ray transmission with these materials and at the same time obtain the desired tensile strength. In particular, a foil made of 17-7 PH type of precipitation hardened chromium-nickel stainless steel is utilized in the preferred embodiment. This alloy is vacuum tight, high in tensile strength and has very attractive x-ray properties: high transmission to primary x-rays, low self-scattering, and reasonably absorbing with respect to patient scattered x-rays. The window 38 is concaved into the tube like a drum head.

The use of materials which are known for high x-ray transmission such as beryllium, aluminum and titanium for example cause the undesirable scattering which is present in some prior art proximity type, x-ray image intensifier devices.

One purpose of having a metallic window 38 is that it can be quite large in diameter with respect to the prior art type of convex, glass window 22, as depicted in FIG. 1, without affecting the x-ray image quality. In one embodiment, the window measures 0.1 mm thick, 25 cm by 25 cm and withstood over 100 pounds per square inch of pressure. The input window can be square, rectangular, or circular in shape, since it is a high tensile strength material and is under tension rather than compression.

The x-ray image passing through the window 38 impinges upon a flat scintillation screen 40 which converts the image into a light image. This light image is contact transformed directly to an immediately adjacent flat photocathode screen 42 which converts the light image into a pattern of electrons. The scintillator and photocathode screens 40 and 42 comprise a complete assembly 43. The electron pattern on the negatively charged screen 42 is accelerated towards a positively charged flat phosphor output display screen 44 by means of an electrostatic potential supplied by a high voltage source 46 connected between the output screen 44 and the photocathode screen 42. Although the display screen 44 is positive with respect to the scintillator-photocathode screen assembly 43, it is at a neutral potential with respect to the remaining elements of the tube, including the metallic envelope 36, to thereby reduce distortion due to field emission. No other elements such as a microchannel plate, for example, are interposed between the output phosphor screen and the photocathode screen as is done in some prior embodiments.

The use of such non-linear devices (with respect to input x-ray dosage) cause distortion in and of themselves but they also increase the deleterious field emission effects since some of the elements of the microchannel plate must operate at different electrostatic potentials with respect to the output display screen and thereby become sources for spurious electron emission.

It should be noted that substantially no focusing takes place in the tube 34 as opposed to the prior art type tube 18 in FIG. 1. The screen 40, the photocathode layer 42 and the display screen 44 are parallel to each other. Also, the gap spacing between the photocathode 42 and the display screen 44 are relatively long, in the range of 6–25 millimeters, thereby reducing the likelihood of field emission and at the same time keeping the electrostatic defocusing to a tolerable level, that is, around 2.0 to 5.0 line pairs per millimeter.

Furthermore, the applied voltage across the gap between photocathode layer 42 and the display screen 44 is in the range 10,000 to 60,000 volts (10 to 60 Kv) which is higher than in Millar's tube, described earlier in this application. In addition, the non-focusing nature of the field avoids the ion spot problem which plagues inverter type tubes. In the preferred embodiments of the invention, the spacing between the photocathode screen 42 and the output display screen 44 is between 6 mm (at 15 Kv) and 25 mm (at 60 Kv). Thus, the voltage per unit of distance, i.e., the field strength, is at least 2 Kv/mm. An upper limit to the field strength is about 5 Kv/mm. In prior art devices such a high field strength was not considered feasible for this application of an image intensifier device because of the field emission problems discussed above and which are obviated in the applicant's device by having all of the tube elements, save for the photocathode-scintillator screen assembly, be at a neutral potential with respect to the output display screen.

The scintillation screen 40 can be calcium tungstate ($CaWO_4$) or sodium activated, cesium iodide (CsI(Na)) or any other type of suitable scintillator material. However, vapor deposited, mosaic grown scintillator layers are preferred for the highly desired smoothness and cleanliness. Since such materials and their methods of application are well known to those skilled in the art, see for example, U.S. Pat. No. 3,825,763, they will not be described in greater detail.

The overall thickness of the scintillator screen 40 is chosen to be 50 to 600 microns thick to give a higher x-ray photon utilization ability than prior art devices, thereby allowing overall lower patient x-ray dosage levels without a noticeable loss of quality as compared to prior art devices. This is because the format of the tube and the absence of several sources of "unsharpness" give an extra margin of sharpness to the image which can be traded off in favor of lower patient dosage levels with greater x-ray stopping power at the scintillator screen 40.

Similarly, the photocathode layer 44 is also of a material well known to those skilled in the art, being cesium and antimony ($Cs_3Sb$) or multi-alkali metal (combinations of cesium, potassium and sodium) and antimony.

The image produced on the phosphor screen 44 is the same size as the input x-ray image. The output phosphor screen 44 can be of the well known zinc-cadmium sulfide type (ZnCdS(Ag)) or zinc sulfide type (ZnS(Ag)) or a rare earth material like yttrium oxysulfide type ($Y_2O_2S$(Tb)) or any other suitable high efficiency blue and/or green emitting phosphor material. The interiorly facing surface of the outut screen is covered with a metallic aluminum film 48 in the standard manner. The phosphor layer constituting the screen 44 is deposited on a high Z glass output window 50. By high Z is meant that the window glass has a high concentration of barium or lead to reduce x-ray back scatter insdie and outside the tube and to shield the radiologist from both primary and scattered radiation.

An important factor in determining the usefulness of any x-ray image intensifier system for medical diagnostic purposes is the conversion efficiency of the tube. The conversion efficiency of the image intensifier tube is measured in terms of output light energy in ergs per square centimeter per x-ray input dosage of 1 roentgen ($erg/cm^2$-R), which can also be expressed in terms of candlas-second per square meter-roentgen ($cd\text{-}sec/m^2$-R) if a green emitting output phosphor like ZnCdS(Ag) type is used.

Several nine inch diameter working proximity type image intensifier tubes have been constructed according to the invention with a conversion efficiency in the range of 3,500 to 60,000 $erg/cm^2$-R. The output phosphors are of the ZnCdS(Ag) type and thus the conversion efficiency can also be expressed in photometric terms as 500 to 8000 $cd\text{-}sec/m^2$-R. This is about equivalent to a brightness gain of 50 to 800 times over that of the old-time fluoroscopic screens for example.

It is important to compare these results with those reported in the Millar article referred to above. The overall conversion efficiency of Millar's tube is 196 to 200 $cdm^{-2}mR^{-1}$ sec or 196,000 to 200,000 $cd\text{-}sec/m^2$-R which is obtained with the MCP operating at 10,000 gain. Removing the MCP and its gain would result in a conversion efficiency around 20 $cd\text{-}sec/m^2$-R, which is too low. Therefore, Millar's article has the effect of leading away from the present invention.

Figure 4:
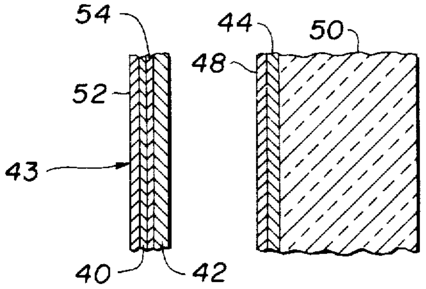
FIG. 4 is an enlarged, vertical view of the encircled detail in FIG. 3, illustrating a cross-section of a portion of the image intensifier tube depicted in FIG. 3.

Referring now more particularly to FIG. 4, in an enlarged cross-sectional view, the details of the scintillation and photocathode screen assembly 43 and the output display screen assembly 44 are illustrated. The screen assembly 43 comprises a scintillator layer 40 of very smooth calcium tungstate or sodium activated cesium iodide which is vapor deposited on a smoothly polished nickel plated aluminum substrate or an anodized aluminum substrate 52 which faces the input window 38. The techniques of such vapor deposition processes are known to those skilled in the art, see for example, U.S. Pat. No. 3,825,763. For direct viewing purposes, the layer 40 is between 200 to 600 microns thick. For radiographic purposes, the layer 40 could be thinner (50–200$\mu$), i.e., the image could be less bright.

As mentioned above, the purpose of the scintillator screen 40 is to convert the x-ray image into a light image. On the surface of the scintillation layer 40 which faces away from the substrate 52, a thin, conductive, transparent electrode layer 54 such as a vapor deposited metallic foil, i.e., titanium or nickel, is deposited and on top of this is deposited the photocathode 42. The photocathode layer 42 converts the light image from the scintillator layer 40 into an electron pattern image and the free electrons from the photocathode 42 are accelerated by means of the high voltage potential 46 toward the display screen 44, all as mentioned above. The scintillator-photocathode screen 43 in this invention is suspended from the tube envelope 36 between the input window 38 and the output screen 44 by several insulating posts 58. One or more of these posts may be hollow in center to allow a high voltage cable 60 from the source 46 to be inserted to provide the scintillator-photocathode screen 43 at the layer 54, with a negative high potential. The remaining parts of the intensification tube including the metallic envelope 36, are all operated at ground potential. This concept of minimizing the surface area which is negative with respect to the output screen results in reduced field emission rate inside the tube and allows the tube to be operable at high voltages and thus higher brightness gain. It also minimizes the danger of electrical shock to the patient or workers if one should somehow come in contact with the exterior envelope of the tube.

To reduce charges accumulated on the insulating posts 58, they are coated with a slightly conductive material such as chrome oxide which bleeds off the accumulated charge by providing a leakage path of less than 20 Kv/cm.

The thick, high atomic number (Z) glass substrate 50 on which the phosphor display screen 44 is deposited forms one exterior end wall of the vacuum tube envelope 36. This glass substrate 50 is attached to the tube envelope 36 by means of a collar 54 made of an iron, nickel, chromium alloy, designated to the trade as "Carpenter, No. 456". Since the thermal coefficient of expansion of this alloy matches that of the glass and nearly matches that of the tube envelope 36, the collar 54 can be fritted to the glass substrate 50 and welded to the tube envelope 36. On the interior surface of the glass wall 50 is deposited the phosphor layer 44 which is backed by a protective and electron transparent aluminum thin film 48 to prevent light feedback and to provide a uniform potential. It also tends to increase the reflection of the phosphor layer 44 to give a higher light output gain.

The essentially all metallic and rugged construction of the tube minimizes the danger of implosion. The small vacuum space enclosed by the tube represents much smaller stored potential energy as compared with a conventional tube which further minimizes implosion danger. Furthermore, if punctured, the metal behaves differently from glass and the air simply leaks in without fracturing or imploding.

The photocurrent drawn by the tube from the power supply 46 is dependent, of course, on the image surface area of the scintillator-photocathode screen assembly 43 and the output display screen 44. For a tube used for direct viewing, the photocurrent would be 0.4 to $0.8 \times 10^{-9}$ amperes/cm$^2$ at an x-ray dosage level of 1 mR/sec.

The applicant has studied other thin metal alloys in the chromium-nickel stainless steel facility as window materials, and found that these alloys are also better than the well known x-ray window materials like beryllium and aluminum but not as good in overall performance as the 17-7 PH stainless steel. These other materials are: precipitation hardened type 15-7 Mo, and work hardened type 304.

The applicant has also found that thin foils of above-mentioned alloy windows are very satisfactory for use as x-ray windows in high vacuum devices like x-ray image intensifier tube as long as the thickness is under 0.25 mm. At 0.125 mm thickness, the x-ray transmission through the 17-7 PH foil is 94% for 120 Kvp x-rays filtered with 23 mm aluminum, 88% for 80 Kvp x-rays filtered with 23 mm aluminum, and 80% for 60 Kvp x-rays filtered with 23 mm aluminum.

Figure 5:
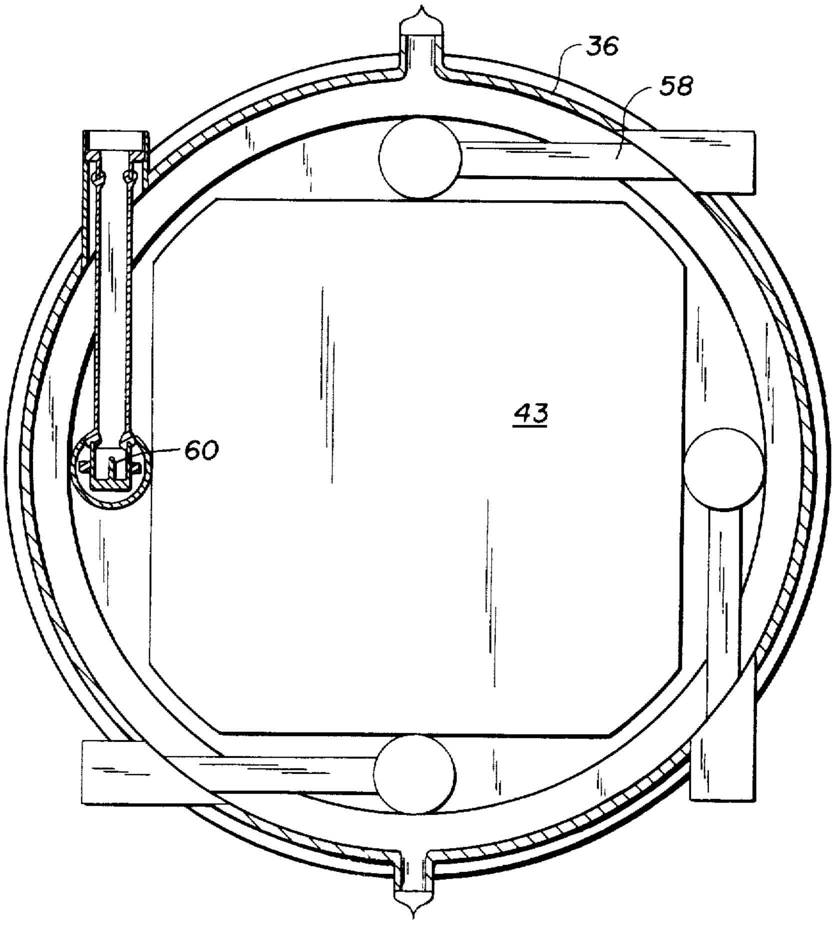
FIG. 5 is a vertical, sectional view, taken generally along the line 5—5 in FIG. 3, of the image intensifier tube according to the invention.

Referring now more particularly to FIG. 5, the x-ray camera 100 according to the invention is illustrated. The camera 100 includes the proximity type image intensifier tube 34 described above, a long focal length optical system 138 and a film 140. As mentioned above, in prior art, conventional radiographic, image intensifier systems the optical system magnifies not only the small output image but all the minute defects which may be present in the output screen as well, resulting in a need for a more critical manufacturing process. In the present invention the optics 138 reduce the size of the image and, correspondingly reduce the apparent size of defects which may be present in the output screen, resulting in a higher yield, less expensive and less demanding manufacturing process. The originally displayed image at the output screen, however, is much larger than in the conventional tube so that the reduced image at the film 140 is of better quality than in conventional systems.

The large output image size combined with the long, in excess of 100 mm, focal length of the optical system 138 in the preferred embodiment makes it less sensitive to thermal expansion than conventional systems. The film 140 is held in a film transport 154 which allows the film to be advanced to take pictures in a serial manner.

Figure 6:
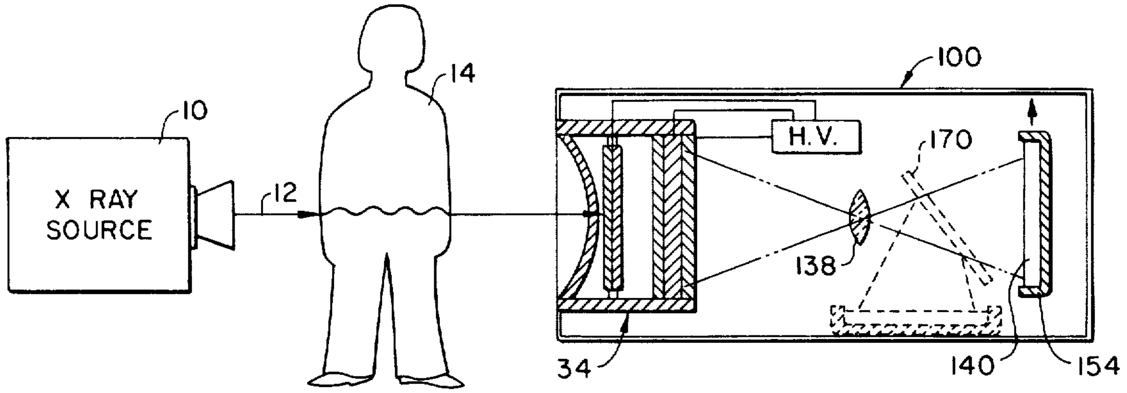
FIG. 6 is a diagrammatic illustration of the x-ray radiographic camera according to the invention.

Frequently the films are better viewed with the emulsion side facing the radiologist. In order to obtain the proper orientation, a mirror 170 (or 3 mirrors or any odd number of mirrors), shown in hidden line fashion in FIG. 6, can be inserted into the optical path resulting in a new film holder position. Mirror 170 can also be made of a partially transmissive mirror (a beam splitter) so that two films can be made with a single x-ray exposure.

The total system speed of the camera 100 of the invention in the medical diagnostic region of the x-ray spectrum, that is 30 to 100 Kev, is in the range of 500 to 5,000 $R^{-1}$. The system speed is defined as the reciprocal of the x-ray radiation dosage incident on the output window of the x-ray image intensifier tube 34 in terms of roentgens (R) required to produce a net density of 1.0 on the photographic film 140. The system speed can be expressed by the following simplified formula S=C T G, where C=conversion efficiency of the image intensifier in terms of output light energy in ergs per square centimeter per x-ray input dosage of 1 roentgen (erg/cm$^2$-R), which can also be expressed in terms of candelas-second per square meter-roentgen (cd-sed/m$^2$-R).

T=fractional light emitted by the output screen collected by the optical system transferred to the photographic film which can be approximated by:

$$T = \frac{t}{4f^2(1+m)^2},$$

where t=transmission of the lens, f=the f number of lens, m=the magnification of the image.

G=photographic sensitivity of the film in the spectral region of the emission of the output phosphor in terms of the reciprocal of the incident light energy per square centimeter in $erg/cm^2$ which is required to produce a net density of 1.0.

Figure 7:
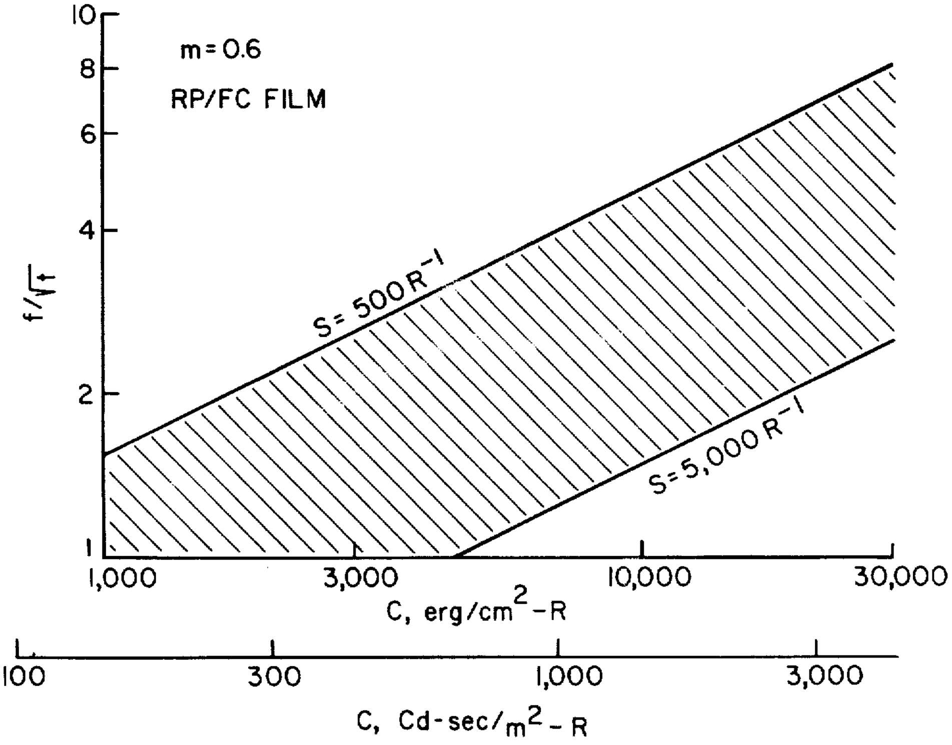
FIG. 7 is a graph relating the design parameters of the x-ray radiographic camera for a commercially available photographic film.

Therefore, the same system speed can be arrived at through many different combinations of the C, T and G. FIG. 7 is an illustrative example of the interlinking nature of these system parameters. FIG. 7 shows the desired operating region of the invention, the shaded area, for a commercial rapid-processable single-emulsion x-ray film marketed by Eastman Kodak Company under the brand name of type 2541 RP/FC film. The key parameter of the optical system, $f/\sqrt{t}$, is plotted against changes in the conversion efficiency of the image intensifier tube, C, to achieve the system speed range of 500 to 5,000 $R^{-1}$. The image magnification of m=0.6 is selected for the purpose of illustration. The system speed in this case can be approximated by the formula:

$$S = 1.2 \frac{CT}{f^2} \frac{cm^2}{erg}$$

If a green emitting output phosphor like ZnCdS(Ag) type is used, the conversion efficiency in terms of $cd\text{-}sec/m^2\text{-}R$ may also be used. This scale is also provided in FIG. 7 for reference.

It is important to add here that several nine inch diameter working proximity type image intensifier tubes according to the invention have been constructed with a conversion efficiency in the range of 3,000 to 10,000 $erg/cm^2\text{-}R$. The output phosphors are of the ZnCdS(Ag) type and thus the conversion efficiency can also be expressed in photometric terms as 400 to 1,400 $cd\text{-}sec/m^2\text{-}R$. A prototype system incorporating these tubes, a f/2 optical system with m=0.6, and Kodak RP/FC film, achieved image quality of accepted film-screen systems and a system speed in the range of 1,000 to 3,000 $R^{-1}$.

It is again important to compare these results with those reported in the Millar article referred to above. The overall conversion efficiency of Millar's tube is more than 100 times the optimum requirement for radiography. On the other hand, removing the MCP and its gain would result in a conversion efficiency which is too low for radiography purposes. Therefore, Millar's article has the effect of leading away from the radiographic camera system of the present invention.

The designed system speed is optimized to take maximum advantage of the amount of information provided by the incident x-ray quanta, such that the recorded image will have balanced image quality and x-ray information. This avoids the problem of a low system speed, i.e., less than the old photofluorographic camera, where the x-ray information is not fully utilized and unnecessary patient radiation dosage results. It also avoids the problem of an unnecessarily high system speed, as in the case of the conventional inverter type of image intensifier tube system, or the Millar, MCP type proximity tube, where the film is exposed with a very small amount of the x-ray information so that the recorded photo contains an insufficient amount of information with a resulting mottled or grainy picture.

Referring back to FIG. 6, the beam splitting mirror 170 can be made such that the larger portion of the light beam is directed to one film while the smaller portion of the light beam is directed to a second film. This arrangement has many advantages in obtaining radiographs in cases where wide latitude of x-ray intensity is encountered. For example, the x-ray intensity after passing through a chest normally would exhibit wide differences between the lung region and the region behind the heart. In this case, an over-penetrated or over-exposed record can be made of the region behind the heart on one film and the normal lung field can be recorded on the second film; all this done with a single x-ray exposure.

The terms and expressions which have been employed here are used as terms of description and not of limitations, and there is no intention, in the use of such terms and expressions, of excluding equivalents of the features shown and described, or portions thereof, it being recognized that various modifications are possible within the scope of the invention claimed.

What is claimed is:

1. A method of making a medical diagnostic x-ray photograph comprising the steps of projecting a beam of x-rays, at a dosage of 30–100 Kev, through a patient to produce an x-ray shadow image, converting the x-ray shadow image into a corresponding light pattern image, converting the light pattern image into a corresponding photo-electron pattern image, converting the photo-electron pattern image by uniformly accelerating all parts of the photo-electron pattern image over an uninterrupted distance of from 2 to 25 mm. with an electrostatic potential of at least 10,000 volts to impinge upon an output phosphor display screen, optically reducing the size of the intensified light pattern image by a factor of from 1.5 to 4 and recording the reduced image on photographic film having a diagonal dimension which is substantially the same size as the diagonal dimension of the reduced image.

* * * * *